United States Patent
Suzuki et al.

(10) Patent No.: US 7,069,104 B2
(45) Date of Patent: Jun. 27, 2006

(54) MANAGEMENT SYSTEM, MANAGEMENT APPARATUS, MANAGEMENT METHOD, AND DEVICE MANUFACTURING METHOD

(75) Inventors: Takehiko Suzuki, Saitama (JP); Hideki Ina, Kanagawa (JP); Koichi Sentoku, Tochigi (JP); Takahiro Matsumoto, Tochigi (JP); Satoru Oishi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 543 days.

(21) Appl. No.: 10/423,888

(22) Filed: Apr. 28, 2003

(65) Prior Publication Data

US 2003/0204348 A1 Oct. 30, 2003

(30) Foreign Application Priority Data

Apr. 30, 2002 (JP) ............... 2002-129326

(51) Int. Cl.
*G06F 9/455* (2006.01)
(52) U.S. Cl. ............... 700/121; 700/29; 700/51; 700/108; 703/2; 716/21; 250/548
(58) Field of Classification Search ............... 700/28, 700/29, 51, 108, 121; 703/2; 705/7, 8; 356/401; 716/19, 21; 250/548; 438/7, 763
See application file for complete search history.

(56) References Cited

U.S. PATENT DOCUMENTS

| | | | |
|---|---|---|---|
| 4,634,240 A | 1/1987 | Suzuki et al. | 350/508 |
| 4,635,373 A | 1/1987 | Miyazaki et al. | 33/180 R |
| 4,645,924 A | 2/1987 | Suzuki et al. | 250/236 |
| 4,669,051 A | 6/1987 | Ina et al. | 356/401 |
| 4,669,885 A | 6/1987 | Ina | 356/443 |
| 4,780,617 A * | 10/1988 | Umatate et al. | 250/548 |
| 4,834,540 A | 5/1989 | Totsuka et al. | 356/401 |
| 4,861,162 A | 8/1989 | Ina | 356/401 |
| 4,886,974 A | 12/1989 | Ina | 250/561 |
| 4,901,109 A | 2/1990 | Mitome et al. | 355/68 |

(Continued)

FOREIGN PATENT DOCUMENTS

EP 1 248 154 A1 10/2002

(Continued)

OTHER PUBLICATIONS

European Search Report dated Jul. 4, 2005, issued in corresponding European patent application No. EP 03 00 9611, forwarded in a Communication dated Jul. 22, 2005.

(Continued)

*Primary Examiner*—Leo Picard
*Assistant Examiner*—Douglas S. Lee
(74) *Attorney, Agent, or Firm*—Fitzpatrick, Cella, Harper & Scinto

(57) ABSTRACT

A management system including an acquisition device for acquiring actual processing results obtained by operating an industrial device with a set parameter value and another parameter value, and an estimated processing result, an inspection device for inspecting the processing result obtained with the set parameter value, and acquiring and accumulating an inspection result value, a change device for changing the set parameter value on the basis of the processing results acquired by the acquisition device and the inspection result value obtained by the inspection device, an evaluation device for evaluating a variation state of the processing results on the basis of an inspection result value accumulated by the inspection device, and a decision device for deciding, on the basis of an evaluation result by the evaluation device, a frequency at which the acquisition device is executed.

12 Claims, 11 Drawing Sheets

U.S. PATENT DOCUMENTS

| | | | | |
|---|---|---|---|---|
| 4,958,160 | A | 9/1990 | Ito et al. | 355/53 |
| 5,243,377 | A | 9/1993 | Umatate et al. | 355/53 |
| 5,586,059 | A | 12/1996 | Oshelski et al. | 364/552 |
| 5,659,384 | A | 8/1997 | Ina | 355/53 |
| 5,682,239 | A | 10/1997 | Matsumoto et al. | 356/349 |
| 5,742,406 | A | 4/1998 | Suzuki | 358/468 |
| 5,805,866 | A * | 9/1998 | Magome et al. | 716/19 |
| 5,847,974 | A | 12/1998 | Mori et al. | 364/571.02 |
| 5,937,069 | A | 8/1999 | Nagai et al. | 380/49 |
| 6,124,922 | A | 9/2000 | Sentoku | 355/53 |
| 6,151,120 | A | 11/2000 | Matsumoto et al. | 356/399 |
| 6,154,281 | A | 11/2000 | Sentoku et al. | 356/401 |
| 6,198,181 | B1 | 3/2001 | Ali et al. | 310/42 |
| 6,223,133 | B1 | 4/2001 | Brown | 702/85 |
| 6,275,988 | B1 | 8/2001 | Nagashima et al. | 725/8 |
| 6,311,096 | B1 | 10/2001 | Saxena et al. | 700/121 |
| 6,333,786 | B1 * | 12/2001 | Uzawa et al. | 356/401 |
| 6,344,892 | B1 * | 2/2002 | Sugita et al. | 355/53 |
| 6,470,230 | B1 * | 10/2002 | Toprac et al. | 700/121 |
| 6,493,065 | B1 | 12/2002 | Ina et al. | 355/53 |
| 6,559,924 | B1 | 5/2003 | Ina et al. | 355/53 |
| 6,563,573 | B1 | 5/2003 | Morohoshi et al. | 356/124 |
| 6,607,926 | B1 * | 8/2003 | Toprac et al. | 438/7 |
| 6,785,583 | B1 | 8/2004 | Oishi et al. | 700/108 |
| 2001/0020946 | A1 * | 9/2001 | Kawakami et al. | 345/582 |
| 2001/0043326 | A1 | 11/2001 | Ina et al. | 356/237.4 |
| 2002/0014601 | A1 * | 2/2002 | Yoshida | 250/548 |
| 2002/0046140 | A1 | 4/2002 | Kano et al. | 705/27 |
| 2002/0051125 | A1 | 5/2002 | Suzuki | 355/53 |
| 2002/0100013 | A1 * | 7/2002 | Miwa et al. | 716/21 |
| 2002/0111038 | A1 * | 8/2002 | Matsumoto et al. | 438/763 |
| 2002/0175300 | A1 | 11/2002 | Suzuki et al. | 250/548 |
| 2002/0176096 | A1 | 11/2002 | Sentoku et al. | 356/620 |
| 2002/0180983 | A1 | 12/2002 | Ina et al. | 356/511 |
| 2003/0012373 | A1 | 1/2003 | Ogura et al. | 380/30 |
| 2003/0022396 | A1 | 1/2003 | Ogawa | 438/7 |
| 2003/0071980 | A1 | 4/2003 | Ina et al. | 355/53 |
| 2003/0119216 | A1 | 6/2003 | Weed | 438/14 |
| 2003/0121022 | A1 | 6/2003 | Yoshitake et al. | 716/21 |
| 2003/0204282 | A1 | 10/2003 | Oishi et al. | 700/108 |

FOREIGN PATENT DOCUMENTS

| | | |
|---|---|---|
| JP | 2000-306815 | 11/2000 |
| KR | 2003-0032871 | 4/2003 |

OTHER PUBLICATIONS

Lee, C., et al., "Reducing CD Variation via Statistically Matching Steppers," *SPIE*, vol. 261, *Integrated Circuit Metrology, Inspection and Process Control IV*, (Mar. 1990). pp. 63-70.

van den Brink, M.A., et al. "Matching Management of Multiple Wafer Steppers Using a Stable Standard and a Matching Simulator," *SPIE*, vol. 1087, *Integrated Circuit Metrology, Inspection, and Process Control III* (Feb. 1989). pp. 218-232.

Lee, C., et al., "Reducing CD Variation via Statistically Matching Steppers," *SPIE*, vol. 1261, *Integrated Circuit Metrology, Inspection and Process Control IV*, (Mar. 1990). pp. 63-70.

van den Brink, M.A., et al. "Matching Management of Multiple Wafer Steppers Using a Stable Standard and a Matching Simulator," *SPIE*, vol. 1087, *Integrated Circuit Metrology, Inspection, and Process Control III* (Feb. 1989). pp. 218-232.

Korean Office Action dated May 23, 2005, issued in a corresponding Korean patent application, No. 10-2003-0027396, with English translation.

\* cited by examiner

US 7,069,104 B2

MANAGEMENT SYSTEM, MANAGEMENT APPARATUS, MANAGEMENT METHOD, AND DEVICE MANUFACTURING METHOD

FIELD OF THE INVENTION

The present invention relates to an industrial device management system, a method, and an apparatus, which manage an industrial device and, more particularly, to effective alignment in a semiconductor exposure apparatus.

BACKGROUND OF THE INVENTION

Circuit micropatterning and an increase in density require a projection exposure apparatus for manufacturing a semiconductor device to project a circuit pattern formed on a reticle surface onto a wafer surface at a higher resolving power. The circuit pattern projection resolving power depends on the numerical aperture (NA) of a projection optical system and the exposure wavelength. The resolving power is increased by increasing the NA of the projection optical system or shortening the exposure wavelength. As for the latter method, the exposure light source is shifting from g-line to i-line, and further, from i-line to an excimer laser. With the excimer laser, exposure apparatuses having oscillation wavelengths of 248 nm and 193 nm are available.

At present, a VUV (Vacuum Ultra Violet) exposure system with a shorter oscillation wavelength of 157 nm and an EUV (Extra Ultra Violet) exposure system with a wavelength of 13 nm are examined as candidates for next-generation exposure systems.

Along with circuit micropatterning, demands have also arisen for aligning at a high precision a reticle on which a circuit pattern is formed and a wafer onto which the circuit pattern is projected. The necessary precision is one-third the circuit line width. For example, the necessary precision in a current 180-nm design is one-third, i.e., 60 nm.

Various device structures have been proposed and examined for commercial use. With the spread of personal computers, and the like, micropatterning has shifted from memories, such as a DRAM to CPU chips. For further IT revolution, semiconductor devices will be further micropatterned by the development of MMIC (Millimeter-wave Monolithic Integrated Circuits), and the like, used in communication system devices called a home wireless LAN and a Bluetooth, highway traffic systems (ITS: Intelligent Transport Systems) represented by a car radar device using a frequency of 77 GHz.

There are also proposed various semiconductor device manufacturing processes. As a planarization technique which solves an insufficient depth of the exposure apparatus, the W-CMP (Tungsten Chemical Mechanical Polishing) process has already been used as a past technique. Instead, the Cu dual damascene process has received a great deal of attention.

Various semiconductor device structures and materials are used. For example, there are proposed a P-HEMT (Psuedomorphic High Electron Mobility Transistor) and an M-HEMT (Metamorphe-HEMT), which are formed by combining compounds such as GaAs and InP, and an HBT (Heterojunction Bipolar Transistor) using SiGe, SiGeC, and the like.

Under the present circumstance of the semiconductor industry, many apparatus variables (=parameters) must be set in correspondence with each exposure method and each product in the use of a semiconductor manufacturing apparatus, such as an exposure apparatus. The number of parameters to be optimized is very large, and these parameters are not independent of each other, but are closely related to each other.

These parameter values have conventionally been decided by trial and error by the person in charge of introducing an apparatus of a device manufacturer. A long time is taken to decide optimal parameter values. If, e.g., a process error occurs after the parameter values are decided, the parameter values of the manufacturing apparatus must be changed again along with a corresponding change in manufacturing process. Also, in this case, a long time is taken to set parameter values.

In the semiconductor device production, the time which can be taken until the start of volume production after the activation of a manufacturing apparatus is limited. The time which can be taken to decide parameter values is also limited. In terms of CoO (Cost of Ownership), the operating time of the manufacturing apparatus must be prolonged. To change a parameter value, which has already been decided, it must be quickly changed. In this situation, it is very difficult to manufacture various semiconductor devices with optimal parameter values. Even a manufacturing apparatus which can originally achieve a high yield can only exhibit a low yield because the apparatus is used without optimizing parameter values, resulting in a potential decrease in yield. Such a decrease in yield leads to a high manufacturing cost, a small shipping amount, and weak competitiveness.

SUMMARY OF THE INVENTION

The present invention has been made to overcome the conventional drawbacks, and has as its object to allow optimizing a predetermined parameter value of an industrial device during volume production by the industrial device.

It is another object of the present invention to achieve optimization of a parameter value during volume production while preventing a decrease in volume production throughput.

According to the present invention, the foregoing object is attained by providing a management system which manages an industrial device, the system comprising a function of changing a frequency of an inspection operation for changing a predetermined parameter value in the industrial device.

According to another aspect of the present invention, the foregoing object is attained by providing a management system comprising acquisition means for acquiring actual processing results obtained by operating an industrial device with a set parameter value and another parameter value, and an estimated processing result, inspection means for inspecting the processing result obtained with the set parameter value, and acquiring and accumulating an inspection result value, change means for changing the set parameter value on the basis of the processing results acquired by the acquisition means and the inspection result value obtained by the inspection means, evaluation means for evaluating a variation state of the processing results on the basis of the inspection result value accumulated by the inspection means, and decision means for deciding, on the basis of an evaluation result by the evaluation means, a frequency at which the acquisition means is executed.

In still another aspect of the present invention, the foregoing object is attained by providing a method of controlling a management apparatus which manages an industrial device and an inspection apparatus for inspecting a processing result by the industrial device, the method comprising a step of changing a frequency of an inspection operation of the inspection apparatus for changing a predetermined parameter value in the industrial device.

Other features and advantages of the present invention will be apparent from the following description taken in conjunction with the accompanying drawings, in which like reference characters designate the same or similar parts through the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In the following embodiments, the industrial device is a semiconductor exposure apparatus, and the parameter to be optimized is a parameter used for semiconductor exposure alignment processing.

FIRST EMBODIMENT

The schematic arrangement and operation of a semiconductor exposure apparatus management system (to be referred to as an exposure management system hereinafter), according to the first embodiment, will be described with reference to FIGS. 1 and 2. In the following description, an alignment variable optimization system corresponding to a volume production will be called OAP (Optimization for Alignment Parameter in volume production). OAP is applied to an exposure apparatus alignment system. Parameter values in this specification include the numerical values of parameters, which can be set by numerical values, and conditions which are not numerical values, such as setting parameter choice data for selecting a sample shot layout or an alignment method. Variables also include apparatus variation elements such as a choice, and generation conditions, in addition to numerical values.

Figure 1:
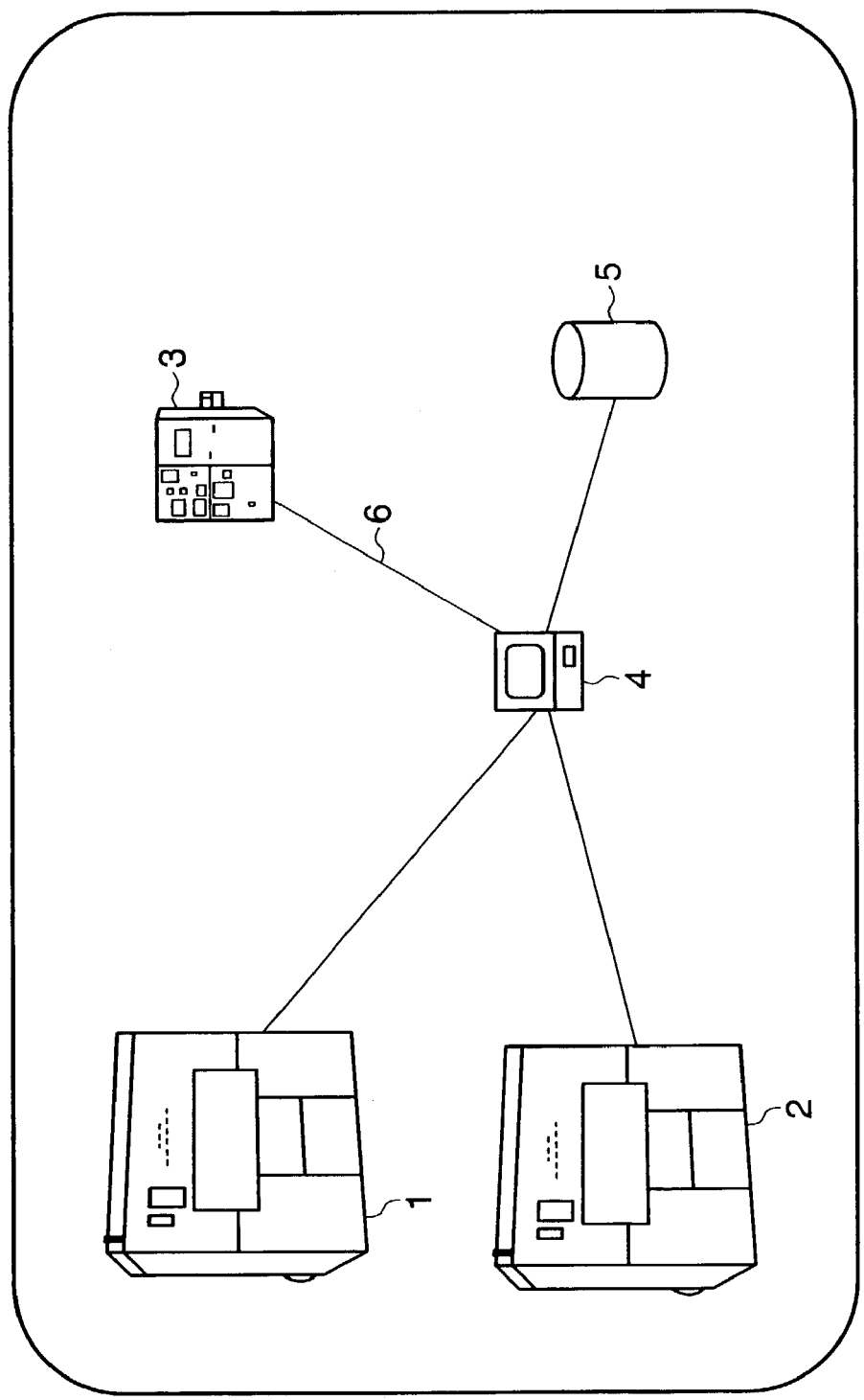
FIG. 1 is a view showing the schematic arrangement of an overall exposure management system according to the first embodiment.
Figure 2:
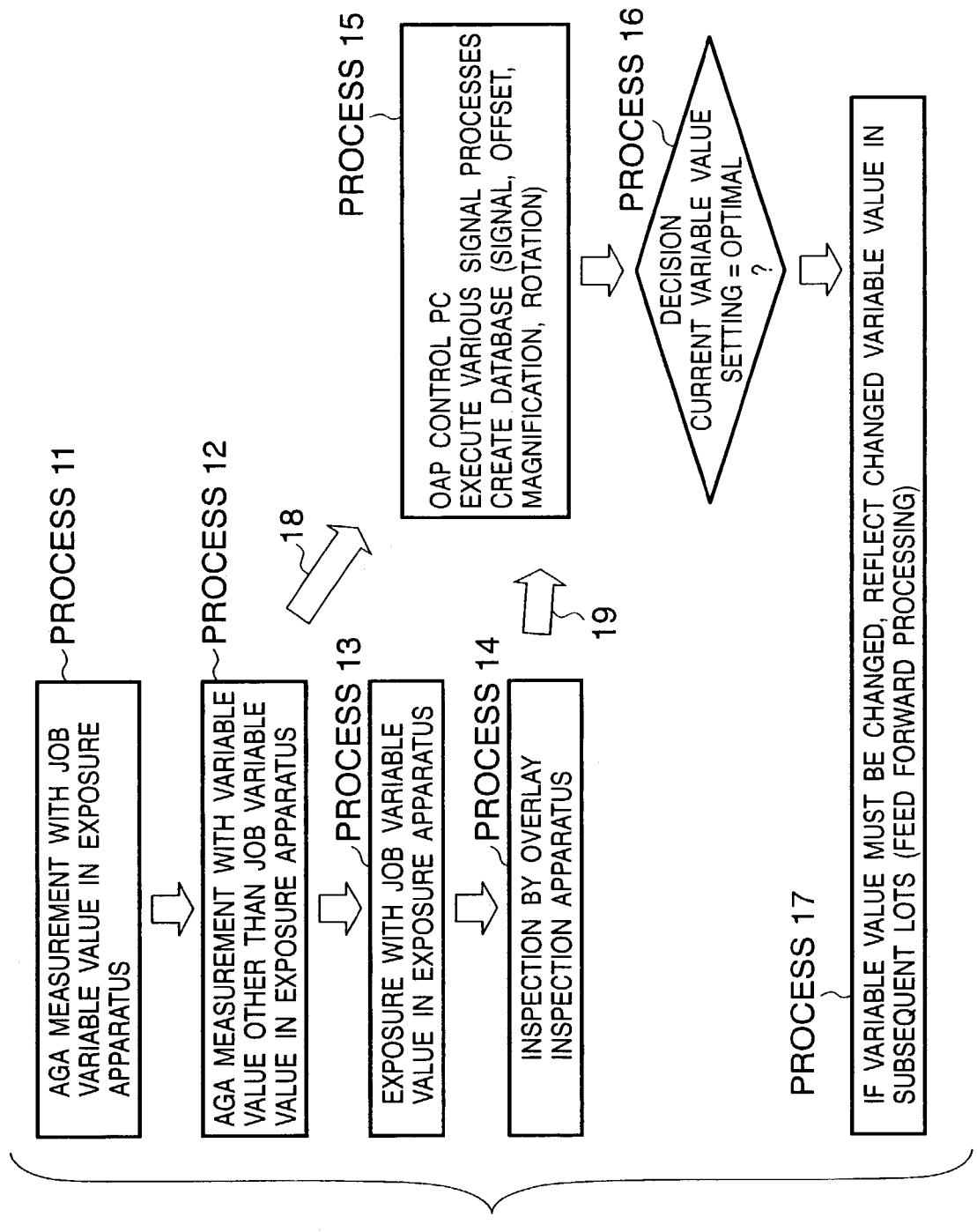
FIG. 2 is a flow chart for explaining a sequence (OAP) of optimizing the alignment variable value of a semiconductor exposure apparatus according to the first embodiment.

FIG. 1 is a view showing the schematic arrangement of an overall exposure management system according to the first embodiment. The exposure management system of the first embodiment includes a plurality of semiconductor exposure apparatuses (to be referred to as exposure apparatuses hereinafter) 1 and 2, an overlay inspection apparatus 3, a central processing unit 4, and a database 5, which are connected by a LAN 6 (e.g., an in-house LAN). The central processing unit 4 collects various measurement values, and the like, from the semiconductor exposure apparatuses 1 and 2 and the overlay inspection apparatus 3, and saves them in the database 5. While the exposure apparatuses 1 and 2 operate in volume production, the central processing unit 4 optimizes parameter values, and notifies the exposure apparatuses 1 and 2 of them.

An OAP sequence according to the first embodiment will be explained with reference to FIG. 2. Assume that a wafer to be exposed is loaded into the exposure apparatus 1, and a corresponding reticle is set in the exposure apparatus (not shown in FIG. 2).

With a variable value (=parameter value, including a mark, an illumination mode and an AGA shot arrangement) set for a job, the exposure apparatus 1 performs global alignment, called AGA (Advanced Global Alignment), in which the wafer position is measured depending on the precision of an X-Y stage equipped with a laser interferometer. A wafer magnification, wafer rotation, and shift amount (all of which will also be called AGA data) at this time are obtained (process 11). The acquired AGA data are transferred to the PC 4, which controls OAP (data transfer 18).

The stage is driven again by using stage driving information at this time. AGA measurement is performed with a parameter other than that for the job, and a wafer magnification, wafer rotation, and shift amount (AGA data) are obtained on the basis of the measurement results (process 12). These AGA data are also transferred as values to the PC 4, which controls OAP, similar to the AGA data obtained with the previous parameter value set for the job (data transfer 18).

In data transfer 18, all alignment signals detected in AGA are transferred to the PC 4. A system which transfers an alignment signal to the PC 4 is called ADUL (Alignment Data Up Load).

After all data concerning AGA measurement are obtained, the wafer is exposed on the basis of the AGA data obtained with the parameter value set for the job (process 13). Processes 11 to 13 are executed in the exposure apparatus 1 (or exposure apparatus 2).

The exposed wafer is developed and transferred to the overlay inspection apparatus 3 in which the alignment result is measured (process 14). Note that measurement of the alignment is measurement of an actual amount (misalignment amount) by which a pattern is misaligned and printed on a wafer regardless of exposure by global alignment based on AGA data.

The PC 4, which controls OAP, stores, in the database 5, the AGA data (including measurement results for parameter values set for the job and for other parameters), such as the wafer magnification, wafer rotation, and shift amount that have been transferred from the exposure apparatus by data transfer 18 (process 15). The PC 4 performs another signal processing (corresponding to a change in parameter value) for the alignment signal detected in AGA. The PC 4 estimates a pseudo wafer magnification, wafer rotation, and shift amount (pseudo AGA data), and stores them in the database 5 (process 15).

The inspection result by the overlay inspection apparatus 3 is also transferred to the PC 4 (data transfer 19), and stored in the database in correspondence with the AGA measurement values by the exposure apparatus that have already been stored in the database by the above process (process 15).

Another signal processing is signal processing using another algorithm. For example, a self-template system is adopted in the job setting pattern matching. The external PC 4 employs another algorithm, e.g., a method of detecting a signal edge and detecting a position, or an algorithm of approximating a signal by a function, obtaining an edge, and then obtaining the center of the edge interval. This allows selecting optimal signal processing in consideration of a characteristic depending on the signal processing algorithm, such as sensitivity to signal distortion. This signal processing includes processing of changing a window width which restricts the signal range for use even with the same processing method.

Examples of this signal processing are as follows:
return symmetric processing
edge differentiation
template pattern matching
these processes using wavelet transformation as a preprocess.

These methods are known techniques, and a detailed description thereof will be omitted.

The correlation between the AGA data, the pseudo AGA data, and the measurement result by the overlay inspection apparatus 3 that have been stored in the database is checked for a designated wafer. Whether the parameter value set for the current job is optimal is decided (process 16). The designated wafer is a wafer set in advance by the operator for measurement from all wafers to be exposed (e.g., every several wafers). Inspection of all wafers in a lot may take a long time. At the beginning, all wafers in one lot undergo overlay inspection. If the inspection result reveals that the precision hardly varies between lots, the operator designates wafers to be inspected such that the first wafer or every several wafers in a lot are set to be inspected.

Whether the parameter value is optimal is decided by comparing a predetermined evaluation value (e.g., a shift amount or a rotation amount) with an evaluation value obtained with the currently set parameter value. If there is a parameter value which provides a better evaluation value than a threshold set in the PC 4 in advance by the empirical rule, or the like, the parameter value is set as an optimal parameter value. The optimal parameter value is reflected in the exposure apparatuses 1 and 2 for exposure of subsequent lots, and used as a parameter value set for the job (process 17). If a parameter value whose evaluation value is better than that obtained with the currently set parameter value, but the difference between these evaluation values does not exceed the threshold, no job parameter value is changed. This is because the difference between these evaluation values falls within the error range, or the effect of changing a parameter value is weak, but a change in parameter value may have an adverse effect (e.g., a decrease in throughput due to the setting change time or degradation of another exposure condition).

By repeating the above processing, the parameter value is optimized and can be used for subsequent lots even upon process variations.

The use of the OAP system can optimize alignment variable values in volume production without examining a special wafer in addition to volume production. The effective performance of the exposure apparatus can be improved without decreasing the productivity.

OAP according to the first embodiment will be briefly expressed as follows: OAP is a feed forward system. That is, actual alignment signals at an AGA shot are acquired or estimated with a parameter value set for a job and another parameter value. The alignment signals are compared with results by the overlay inspection apparatus, and an alignment parameter value is optimized for use in subsequent lots.

"Feed forward" and opposite "feedback" described in this embodiment will be defined.

"Feedback" is so-called preprocessing. More specifically, several send-ahead wafers are aligned and exposed before lot exposure processing to obtain an offset by the overlay inspection apparatus. The result is input as an offset value to the exposure apparatus, and the remaining wafers in the lot are processed.

While CD-SEM measurement is performed especially for a small-capacity lot, an offset is obtained by the overlay inspection apparatus. In this case, the first embodiment can be more effectively applied.

In "feed forward", no send-ahead wafer is used, but the results of the preceding lot are used by various numerical processes. "Feed forward" is proposed in consideration of the situation in which the use of an expensive exposure apparatus with a long Up Time is superior to preprocessing in terms of CoO. "Feed forward" can be effectively applied to volume production on the premise that currently set variables are almost optimal.

The flow of OAP processing shown in FIG. 2 can be briefly described as follows.

(1) The exposure apparatus performs AGA by using parameter values (including a mark, an illumination mode, and an AGA shot layout) set for a job, and transfers the obtained AGA data and alignment signal to the OAP control PC.

(2) The exposure apparatus performs the same AGA measurement by using parameter values other than those set for the job, and transfers the obtained AGA data and alignment signal.

(3) The alignment signals obtained in (1) and (2) are processed by different processing methods to calculate pseudo AGA data (another processing method is to, e.g., change the window width).

(4) The exposure apparatus exposes the wafer on the basis of the AGA measurement results using the set parameter values.

(5) The exposed wafer is transferred to the overlay inspection apparatus 3 in which the misalignment amount of the aligned exposure result is measured.

(6) The measurement result by the overlay inspection apparatus 3 is acquired.

(7) A database (alignment signal, offset, wafer magnification, and wafer rotation) is created from the AGA data obtained in (2), the pseudo AGA data generated in (3), and the inspection data acquired in (6).

(8) Whether the currently set parameter value is optimal is decided.

(9) If the parameter value must be changed, the changed parameter value is reflected in subsequent lots (Feed Forward processing).

This is OAP basic processing. In the first embodiment, the extraction frequency of wafers subjected to AGA measurement and ADUL with a parameter value other than a set parameter value, i.e., wafers subjected to wafer sampling is optimized. Extraction frequency optimization processing according to the first embodiment will be explained.

In OAP, AGA measurement with a parameter value other than a set parameter value and processing (ADUL) of sampling wafer alignment waveform data are executed. In this case, a time for processing unrelated to the production amount is required, and the throughput may decrease in terms of only the processing speed in comparison with an apparatus which does not perform OAP. In other words, wafer sampling may decrease the throughput.

To prevent this, the first embodiment decides (optimizes) the extraction frequency of wafers subjected to wafer sampling in accordance with the apparatus, the process, the apparatus environment, and the overlay precision obtained by the overlay inspection apparatus 3. Wafer sampling is executed not for all wafers, but at a proper frequency, which suppresses a decrease in throughput.

If, for example, the apparatus is stable, and set parameter conditions (parameter values) can cope with all volume production lots without any change, the parameter conditions can be directly used. However, the apparatus state, a state depending on the process, and the like, actually change, and the set parameter values are not permanently used. From this, in the first embodiment, an appropriate wafer sampling frequency is decided in accordance with the situation, and both optimization of a parameter value during volume production and maintenance of the throughput in terms of the processing speed are satisfied.

As a wafer sampling method, it is effective to analyze database data collected in OAP.

It is effective to steadily check inspection data by the overlay inspection apparatus. When a sample sequence {xi|i=1, 2, . . . , N} complying with a given probability distribution is supplied as statistical basic processing, the (sample) mean and (sample) variance are defined by:

$$\bar{x} = \frac{1}{N}\sum_{i=1}^{N} x_i$$

$$\sigma^2 = \frac{1}{N}\sum_{i=1}^{N}(x_i - x)^2$$

These values are representative statistics calculated from the sample sequence, and are basic values used in many image processing applications. The square root of the (sample) variance is called the standard deviation.

The offset between a result by the overlay inspection apparatus 3 and AGA data is monitored from these basic statistical calculations. If the 3σ value greatly deviates from a set allowance, or variations much shorter than the lot exchange cycle exist, a larger wafer sampling count merely increases the need for changing a parameter value. The apparatus becomes unstable, and the changed parameter value cannot be satisfactorily applied to wafers in the next lot. That is, if the apparatus performance cannot be fully exploited, the apparatus suffers from an unstable factor, which cannot be eliminated by optimization of a parameter value, and the apparatus must be maintained. In this case, the operator is warned of this by an error display, or the like.

Short-term variations mean variations in offset between wafers in lots during the same period. To the contrary, long-term variations mean variations in offset between, e.g., a given lot and a preceding lot. Such variations can be discriminated by the above expressions because a given process will be executed next after several months in typical semiconductor manufacture. If the error generation probability distribution is a random one, such as a normal distribution, a larger number of sampling wafers can stabilize data with high reliability because of the averaging effect. However, with an error with which the sampling value cannot represent variations and, e.g., gradually shifts, such as an error occurred in the CMP process, a larger number of sampling wafers cannot provide a stable result.

OAP can be effectively applied when the alignment precision can be kept at a predetermined level by optimization of the alignment parameter value of the apparatus (including optimization of signal processing such as image processing) against any factor which decreases the alignment precision.

The stability of the alignment precision is also influenced by the stability of the apparatus and the process stability of the manufacturing line. The factor which decreases the alignment precision is analyzed by changing parameter conditions, but it is difficult to specify the factor.

The extraction frequency (wafer sampling frequency) of wafers subjected to wafer sampling is decided on the basis of a database of overlay precision results (measurement results by the overlay inspection apparatus) and precision results of signal processing based on the alignment waveform. Wafer sampling frequency decision processing according to the first embodiment will be explained in detail.

Wafers subjected to OAP, i.e., wafers subjected to wafer sampling are desirably all wafers at the beginning of the process. This is because the stability of the apparatus or process is not known as the beginning of the process.

If it is determined in OAP from wafer sampling results and wafer inspection results by the overlay inspection apparatus 3 that a parameter value other than one set for the current job is more proper, this parameter value is reflected in the parameter value of processing for the next lot. That is, the variable value of the succeeding lot is changed to reflect the result of the preceding lot. For this purpose, an initially set job parameter is used as a reference parameter and fluctuations in offset data and alignment waveform for the reference parameter stored in the external PC4. The external PC4 also calculates and stores fluctuations in offset data and alignment waveform unit different parameters. The external PC4 compares the fluctuations for the reference parameter with the fluctuations for different parameters, and determines whether a job parameter more effective than the reference parameter exists.

Whether a job parameter is effective is decided by, e.g., analyzing the variation distribution of alignment data at AGA shots on a wafer, which provides the trend of stability. Alignment data includes a shift amount from an ideal matrix depending on the stage precision in global alignment, and a measurement result by the overlay inspection apparatus. Variations in the database are checked by rearranging the database by the OAP controller, thus attaining the trend of wafer sampling.

Whether the alignment precision to a wafer in each process (step) is high or low is determined from an inspection result by the overlay inspection apparatus. In a high-precision step, the wafer sampling count suffices to be small because of fewer variations between all samples. A method of setting the number of wafers subjected to wafer sampling, e.g., the number of wafers in each lot can be decided from the throughput, allowance precision, and margin.

Figure 4:
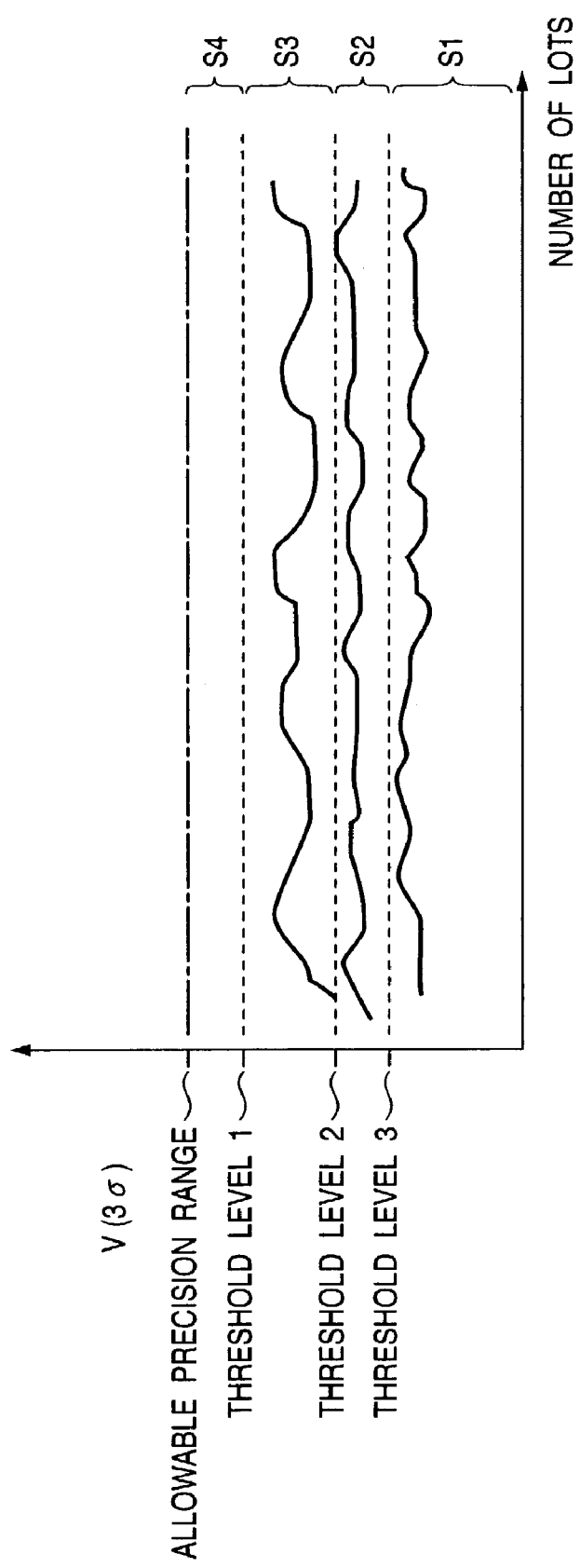
FIG. 4 is a graph showing an example of level decision analysis for variations in wafer alignment precision according to the first embodiment.

For example, the threshold of the standard deviation for each lot is set to thresholds 1 to 3, as shown in FIG. 4, and the extraction frequency is decided from the standard deviation of each lot. That is, overlay inspection is executed for all wafers in several initial lots, the trend of precision is monitored, and the overlay precision is ranked, details of which will be described later. The $3\sigma$ value representing variations is ranked by the threshold, and an extraction frequency corresponding to the rank is decided. In wafer sampling after the extraction frequency is decided, the alignment precision is monitored in time series. If the precision decreases, the wafer sampling execution frequency is increased. In this manner, the frequency is changed in accordance with the situation.

Sampling for each lot will be exemplified. Factors which decrease the alignment precision include environmental variations for each process, apparatus, and line, as described above. Which factor decreases the alignment precision must be separately analyzed. According to the basic concept of the wafer sampling, many wafer data are obtained at the beginning of the process, and the wafer sampling execution frequency is decided from the margin for the data allowance precision.

Figure 3:
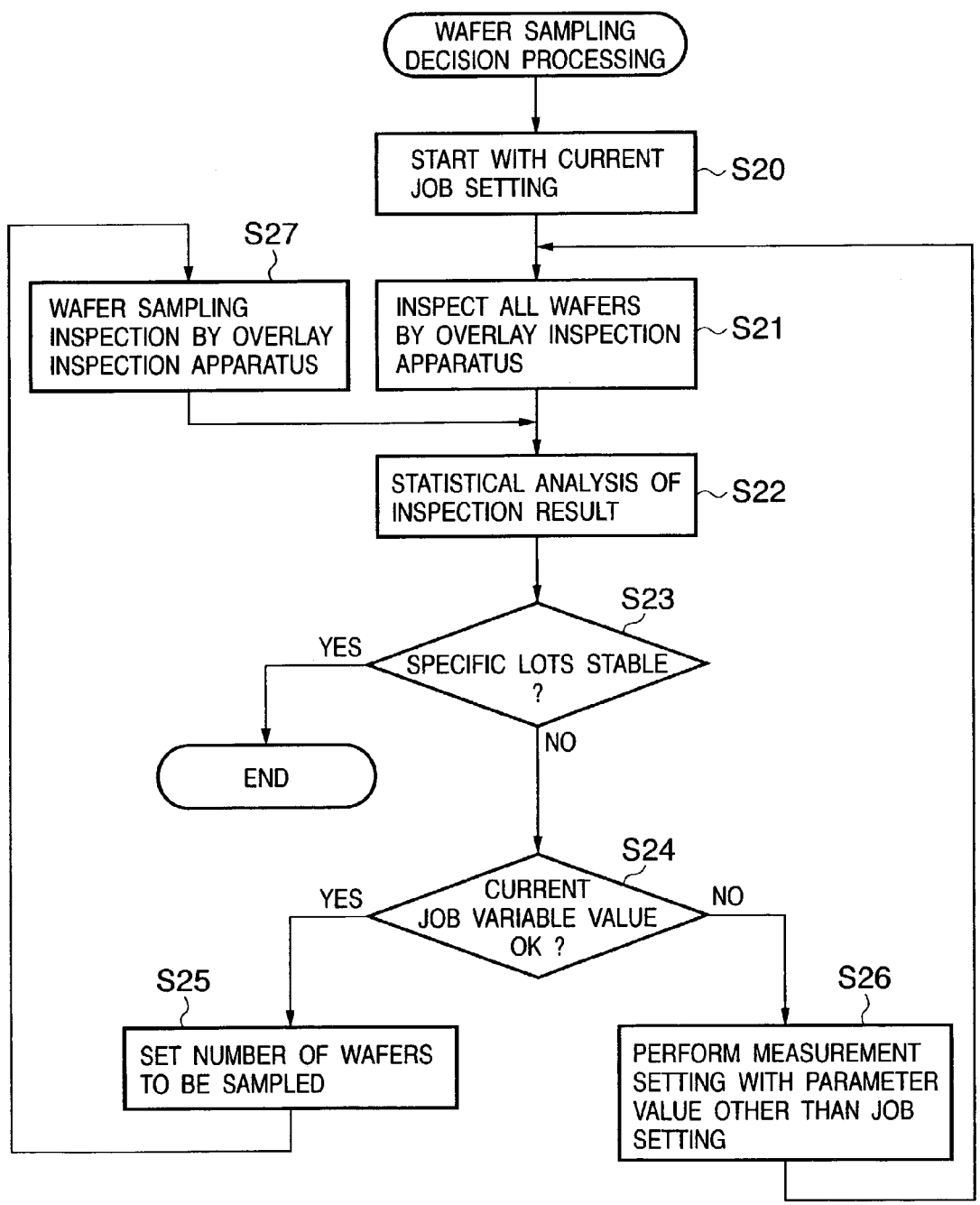
FIG. 3 is a flow chart for explaining a wafer sampling execution frequency decision processing according to the first embodiment.

FIG. 3 is a flow chart for explaining wafer sampling decision processing. In the first embodiment, the wafer sampling execution frequency is set on the basis of the shift amount between an inspection result by the overlay inspection apparatus and AGA data without performing ADUL (wafer sampling) for initial lots. If the shift amount is large and the parameter value must be changed, the parameter value is optimized by OAP, as shown in FIG. 2, and the above-described processing is executed.

Exposure processing for initial lots starts with the current job setting which has already been decided (step S20). Alignment overlay data in exposure of all wafers in each initial lot are inspected by the overlay inspection apparatus at the start of each exposure process (step S21).

The vertical structure of an alignment mark changes between processes in the semiconductor manufacturing process. The alignment offset of the exposure apparatus must be obtained in all process wafers by using the overlay inspection apparatus. The results are communicated to OAP. The communication means is the LAN 6 in the first embodiment, but may be another known communication means.

The inspection results are statistically analyzed (step S22). In the first embodiment, (1) the variation cycle and variation width of the shift amount between AGA data and the inspection result of each wafer in each lot are checked. (2) Variations in the $3\sigma$ value of the shift amount of each lot are checked.

Figure 5:
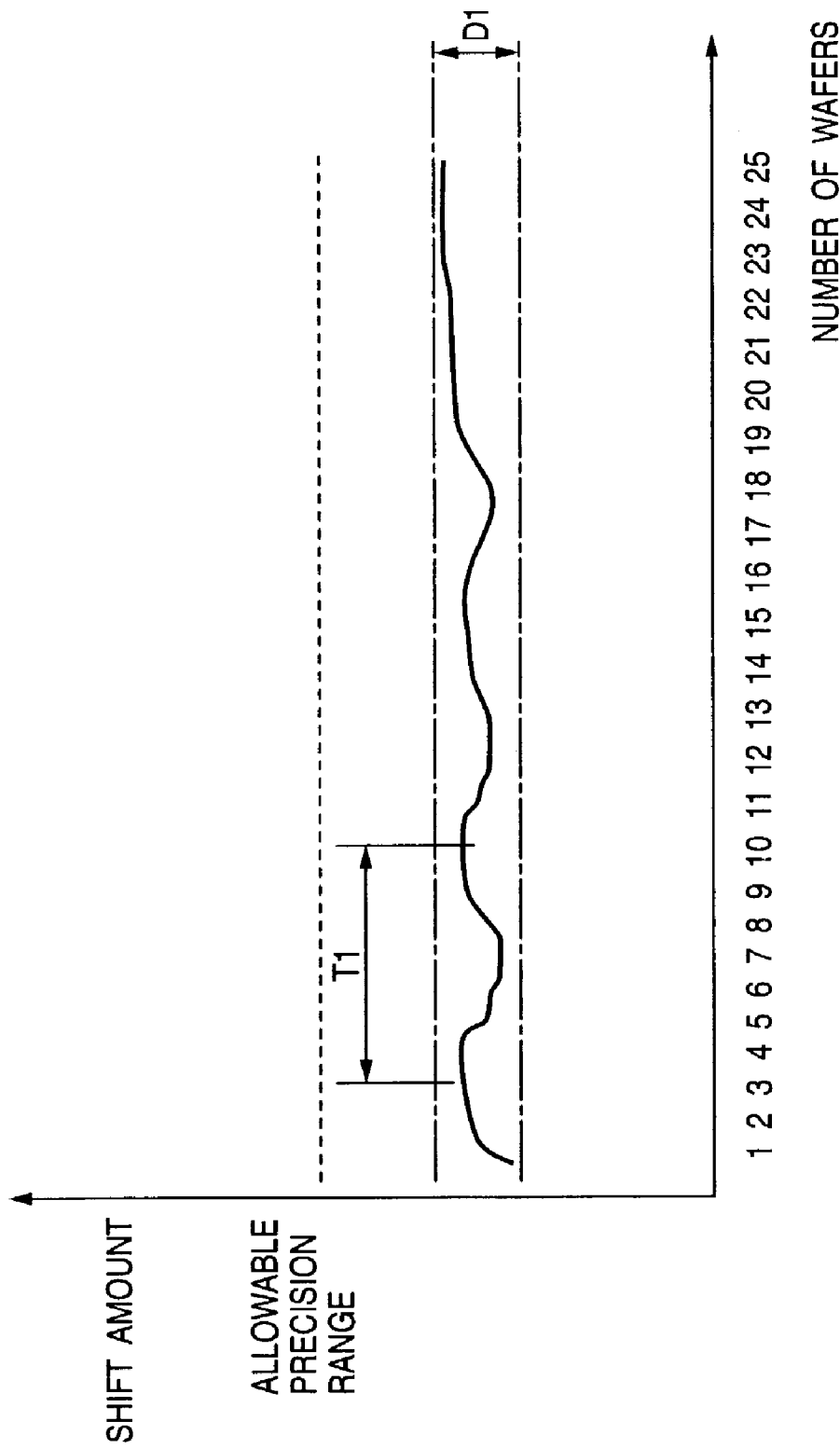
FIG. 5 is a graph showing another example of level decision analysis for variations in wafer alignment precision according to the first embodiment.
Figure 6:
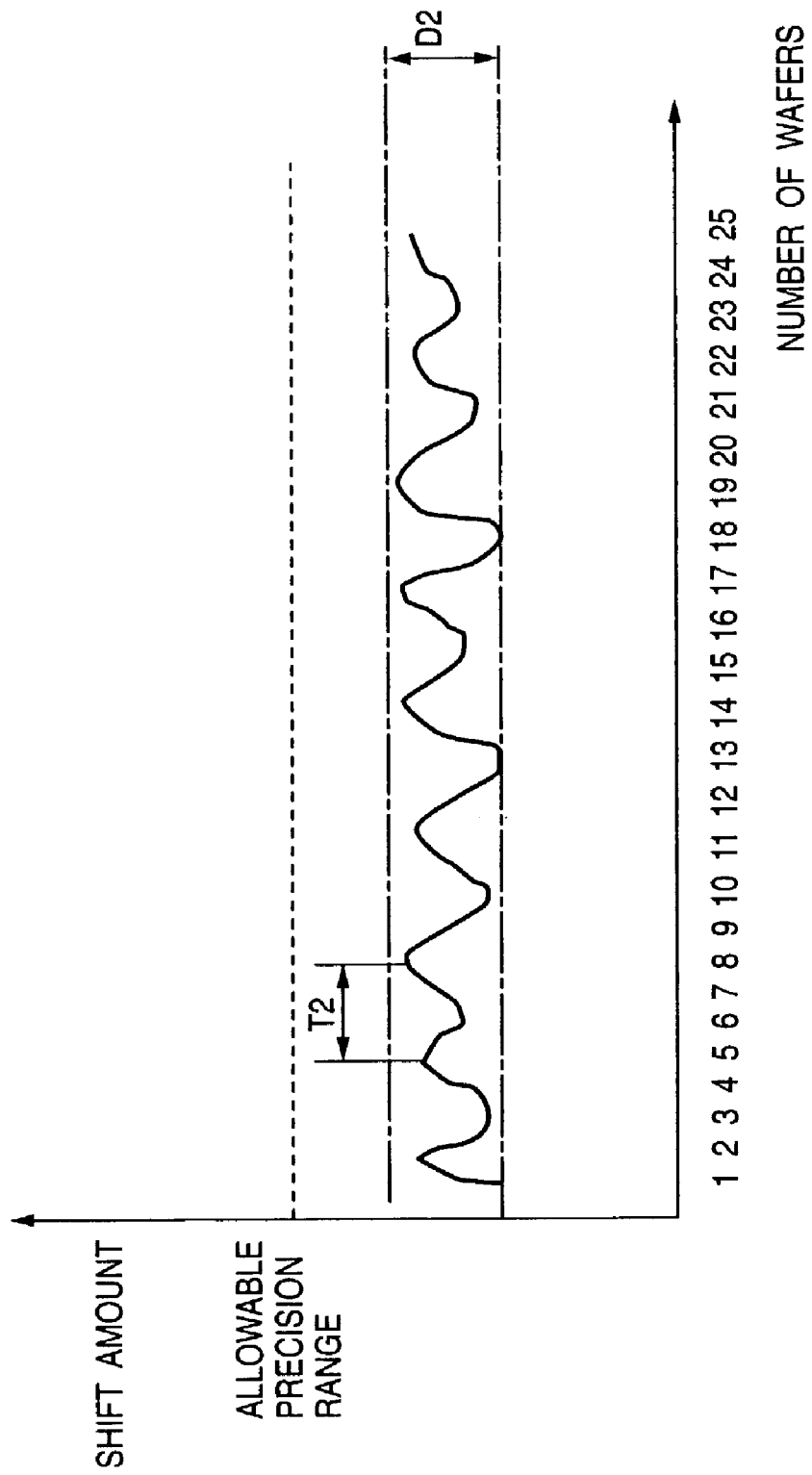
FIG. 6 is a graph showing still another example of level decision analysis for variations in wafer alignment precision according to the first embodiment.

The signal variation cycle can be easily obtained by checking an increase/decrease in shift amount value and checking the sign of the numerical value. FIGS. 5 and 6 show variations in shift amount and the variation cycle. In FIGS. 5 and 6, T1 and T2 represent variation cycles, and D1 and D2 represent variation widths. Sampling in at least half the variation cycle can restore the original variation waveform on the basis of the sampling theorem. Wafer sampling is performed based on the variation waveform.

If variations have any regularity, the $3\sigma$ value can be suppressed to be small with a small sampling count in consideration of the cycle. In FIG. 5, sampling suffices to be done for every three wafers, for T1=6. For twenty-five wafers in a lot, eight wafers are subjected to sampling.

This method can be applied to cyclic variations, but cannot be applied to random variation. The variation width is decided by $3\sigma$ on the basis of the standard deviation $\sigma$. FIG. 4 is a graph showing the $3\sigma$ values of the shift amounts, which are obtained on the basis of inspection results by the overlay inspection apparatus 3 and plotted for several lots. The precision level is divided into a plurality of thresholds and determined within the allowable precision range.

The shift amount whose $3\sigma$ value is equal to or lower than threshold 3 is stable, and the job variable can be decided to be optimal. If this state is confirmed to stably continue, wafers in one lot are decided to be satisfactorily sampled. In this wafer, wafer sampling can be decided from the level of the $3\sigma$ value.

For example, the number of wafers can be set to ten for threshold range S2, and fifteen for threshold range S3. The number of wafers at each threshold can be changed by decision of the process manager.

If the $3\sigma$ value is stable over a specific number of lots, the job variable can be decided to be reliable for volume production. As for wafer sampling, conditions can be fixed unless the process or apparatus changes. Accordingly, the processing ends (step S23).

The specific number of lots can be set by the process manager. If the $3\sigma$ value cannot be confirmed in step S23 to be stable over the specific number of lots, the processing advances to step S24. In step S24, whether the currently set parameter value is proper is determined on the basis of variations in shift amount. If YES in step S24, the number of wafers subjected to wafer sampling is decided in accordance with the threshold in step S25 (threshold range S4: twenty wafers/lt, threshold range S3: fifteen wafers/lot, threshold range S2: ten wafers/lot, and threshold range S1: five wafers/lot). In step S27, inspection by the overlay inspection apparatus 3 is performed at an execution frequency decided in step S25.

If NO in step S24, the processing advances to step S26. In step S26, OAP processing shown in FIG. 2 is executed to optimize the parameter value. After that, the processing is repeated from step S21. The current parameter value may be determined to be changed when the $3\sigma$ value decreases by two threshold levels between preceding and succeeding lots.

As described above, setting of the number of wafers to be sampled and decision of whether the current job parameter setting value is proper can be automatically executed on the basis of the threshold. In general, when the process and apparatus job parameter setting value are not decided, conditions are changed and confirmed, and the precision may also vary. This case will be exemplified.

For example, setting an AGA shot will be described. In measurement, the measurement span can be prolonged by setting AGA shots as close to the periphery of the wafer as possible, and the precision of the AGA measurement value increases. However, the alignment mark asymmetry caused by a process error called WIS (Wafer Induced Shift) degrades as shots are set closer to the periphery of a process wafer in CMP, or the like.

In deciding AGA shots, the alignment precision is monitored and examined by changing the setting to the outermost position, slightly inner position, and inner position. In this case, which position is finally set as an AGA shot is decided from the AGA measurement reproducibility, inspection results by the overlay inspection apparatus after exposure, and the like. Alternatively, variations in alignment precision may be monitored while changing settings such as the number of AGA shots, the illumination mode, and the processing window.

Figure 7:
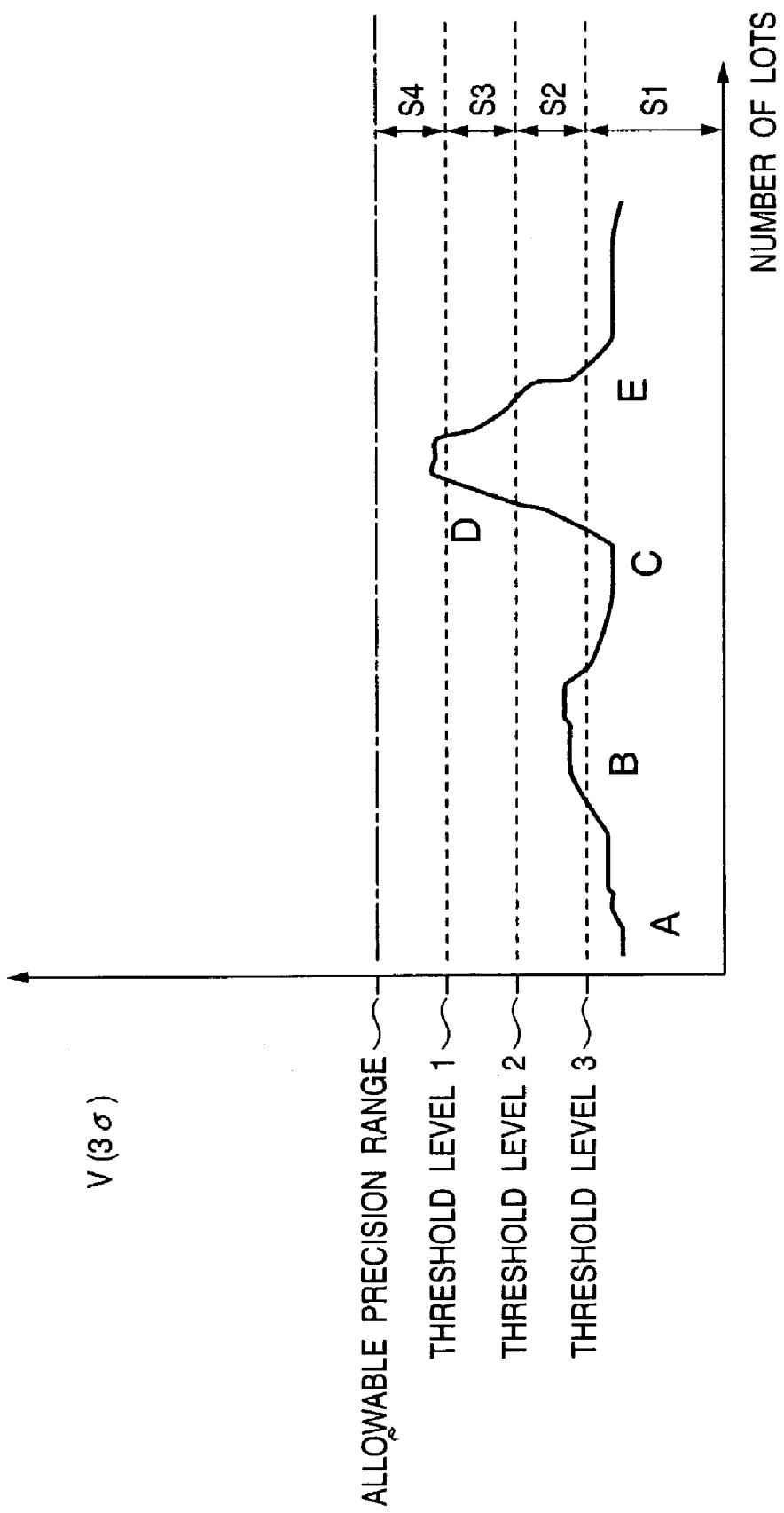
FIG. 7 is a graph showing still another example of level decision analysis for variations in wafer alignment precision according to the first embodiment.

FIG. 7 is a graph showing plotted precision results by the overlay inspection apparatus (AGA data such as the wafer magnification, wafer rotation, or shift amount are stored in a database and its change is monitored in time series).

The allowable precision range is divided at thresholds 1 to 3 to divide the precision range into ranges S1 to S4, which can be used to determine the precision level.

If the first data falls within precision range S1 in FIG. 7, processing starts for five wafers/lot after all data are acquired because of high precision. This setting is not changed if the precision does not decrease after several lots. If data degrades, as represented by B, the number of samples is increased to ten wafers/lot for several lots because B is at level S2. If the precision settles, as represented by C, wafer sampling is performed for five wafers/lot. If the precision abruptly decreases, as represented by D, the job parameter condition (parameter value) is set again. This is because the apparatus may degrade due to any factor or the process factor must be set again. As long as the precision is stable for a long term, the number of samples is decreased to one wafer/lot, and the precision is monitored. Even if the precision remains stable, one wafer/lot may be kept unchanged.

For gradual variations in 3σ value, the number of wafers to be sampled for each lot is decided in accordance with the threshold range with the current job parameter value. For example, when the setting range is set to three levels, as shown in FIGS. 4 and 7, the number of wafers is set to five, ten, fifteen and 20, in an order from a high-precision range (from S1 to S4) (Step S25).

When the 3σ value abruptly changes with a large variation width, as represented by a range from C to D in FIG. 7, it is also effective to change process conditions and monitor the change because any apparatus state or process state may change. In the first embodiment, OAP processing described with reference to FIG. 2 is executed to optimize the parameter value (step S26). The exposure apparatus 1 (or 2) is instructed via the LAN 6 to change the set parameter value, and then changes the job setting.

The parameter value change timing is applied to the next lot in feed forward. As another application example, if the lot is an initial one and conditions have not been stabilized yet, the job variable condition can also be changed in a subsequent lot when the inspection result is decided to become stable after a plurality of wafers in a given lot. In this case, feedback processing is executed. After the process is changed in step S26, inspection of all wafers by the overlay inspection apparatus 3 realizes high-precision inspection (step S21).

For example, when the precision is to be increased from a precision required for the process, conditions for each process or apparatus can be set by changing the threshold and allowable precision condition for each process. Apparatuses may have many differences, and it is preferable to set the allowance for each apparatus because the apparatus difference can be individually coped with.

If the number of wafers is decided in step S25, the exposure apparatus performs OAP and exposure processing, and then, the overlay inspections apparatus inspects sample wafers (step S27). By repeating a series of processes, a proper execution frequency of wafer sampling can be automatically decided. The execution frequency decided in step S25 is set as the wafer sampling execution frequency in the exposure apparatus after the processing ends in step S23.

A factor which decreases the precision can be analyzed by measuring an alignment measurement waveform accumulated in a database in OAP or measuring an actual wafer shape by a CD-SEM. If the cause is found and the precision becomes stable, the number of wafers to be sampled can be decreased, suppressing a decrease in throughput in ADUL. Lot management optimal for both a decrease in throughput and precision guarantee can be achieved by performing wafer sampling in accordance with a measurement result by the overlay inspection apparatus in the OAP database.

The number of wafers to be sampled can be changed by each keyboard input as far as OAP or a touch panel console connected to an OAP controller can be controlled by the PC base.

SECOND EMBODIMENT

Figure 8:
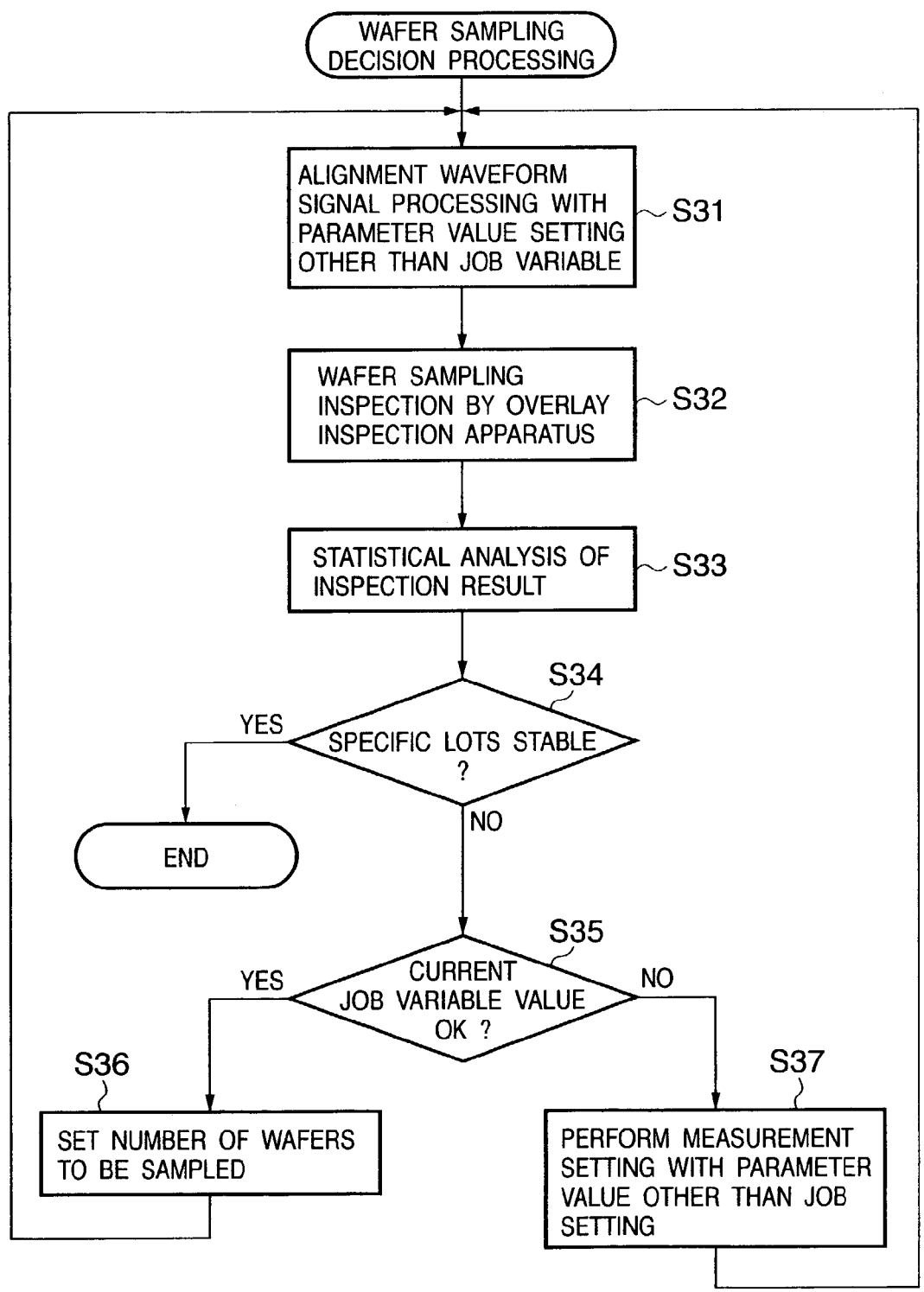
FIG. 8 is a flow chart for explaining wafer sampling execution frequency decision processing according to the second embodiment.

FIG. 8 is a flow chart for explaining processing of deciding alignment data other than a job variable value according to the second embodiment. In the first embodiment, the parameter value (including signal processing) set for a job is fixed, an initial lot is processed without transferring ADUL data with an alignment waveform, and the wafer sampling execution frequency is decided from measurement results by the overlay inspection apparatus 3. In the second embodiment, ADUL for alignment waveform data is executed from an initial lot under a condition other than the job variable value, and the precision result is analyzed to decide the wafer sampling execution frequency.

A case wherein the job variable value is set, but the precision does not satisfy a specific value, and the job variable value is further changed to increase the precision, will be described.

Wafer sampling is performed with a job variable value and another parameter condition (parameter value) set for all wafers (step S31). Exposure and developing are done on the basis of an alignment result obtained with a parameter value set for a job in advance, and an overlay precision result is evaluated by an overlay inspection apparatus. A pseudo exposure result is examined under a condition other than the job variable value on the basis of the alignment result of exposure with the set parameter value as an inspection result by the overlay inspection apparatus. "Pseudo" means examination at the measurement precision of the exposure apparatus without actual exposure. An alignment signal waveform is also acquired, and thus, various signal processes can also be examined. Processing other than signal processing, which is actually used in alignment by the exposure apparatus for exposure processing, can also be performed. This examination is executed by statistical processing using a plurality of wafers in a lot, obtaining an examination result (step S33).

The specific number of lots is set in advance, and if the precision falls within an allowable precision range for the specific number of lots, the processing ends (step S34). If the precision is not kept for the specific number of lots, whether to change the current set parameter value is determined.

The precision is compared by the 3σ value between the current processing and processing under a condition other than the job variable value. If the job variable value varies at a reduced level within a lot, the setting is changed to the number of wafers to be sampled that is set in advance (classified by the threshold level in the first embodiment), in accordance with the precision.

If the precision does not have any margin for a demanded precision, or the 3σ value becomes more stable upon a change in the job variable value, the exposure apparatus is instructed to change the parameter value set for the current job to another parameter value (step S37). In this case, it is also possible to further increase the wafer sampling frequency in accordance with the situation, and then return the processing to step S31.

THIRD EMBODIMENT

The third embodiment will be described. The third embodiment prevents a decrease in throughput in performing OAP according to the first embodiment. As described in the first embodiment, AGA data acquisition (AGA measurement or ADUL) with a parameter value other than a job parameter value in OAP requires a time for processing unrelated to the production amount. The throughput may decrease in terms of only the processing speed in comparison with an apparatus which does not perform OAP. To prevent this, the first embodiment optimizes the wafer sampling frequency.

In the third embodiment, an alignment precision and job parameter value, which are measured by an overlay inspection apparatus, AGA measurement data of parameter values except for the job setting parameter value, and various signal processing results, are continuously decided in time series in order to comprehensively decide an environment where the apparatus and process are located. Accordingly, the apparatus performance is determined in accordance with the precision rank within a necessary precision range, and the apparatus CoO is maximized in terms of both the throughput and performance.

In OAP, it is ideal to set and confirm all parameter values other than a job parameter value during the operation of the apparatus. However, this decreases the throughput. Thus, predicted parameter value candidates are assumed to acquire measurement data and decide them by an external controller.

The third embodiment provides a method of maximizing the performance of the apparatus operation by automatically monitoring the apparatus for, e.g., a situation (warning decision before exposure), in which the apparatus performance cannot be satisfied by decision of a parameter change, decision of the acquisition frequency of a parameter value other than a job parameter value and for an exposure apparatus, an alignment signal processing waveform, execution/non-execution of OAP itself, and a change in parameter.

Figure 9:
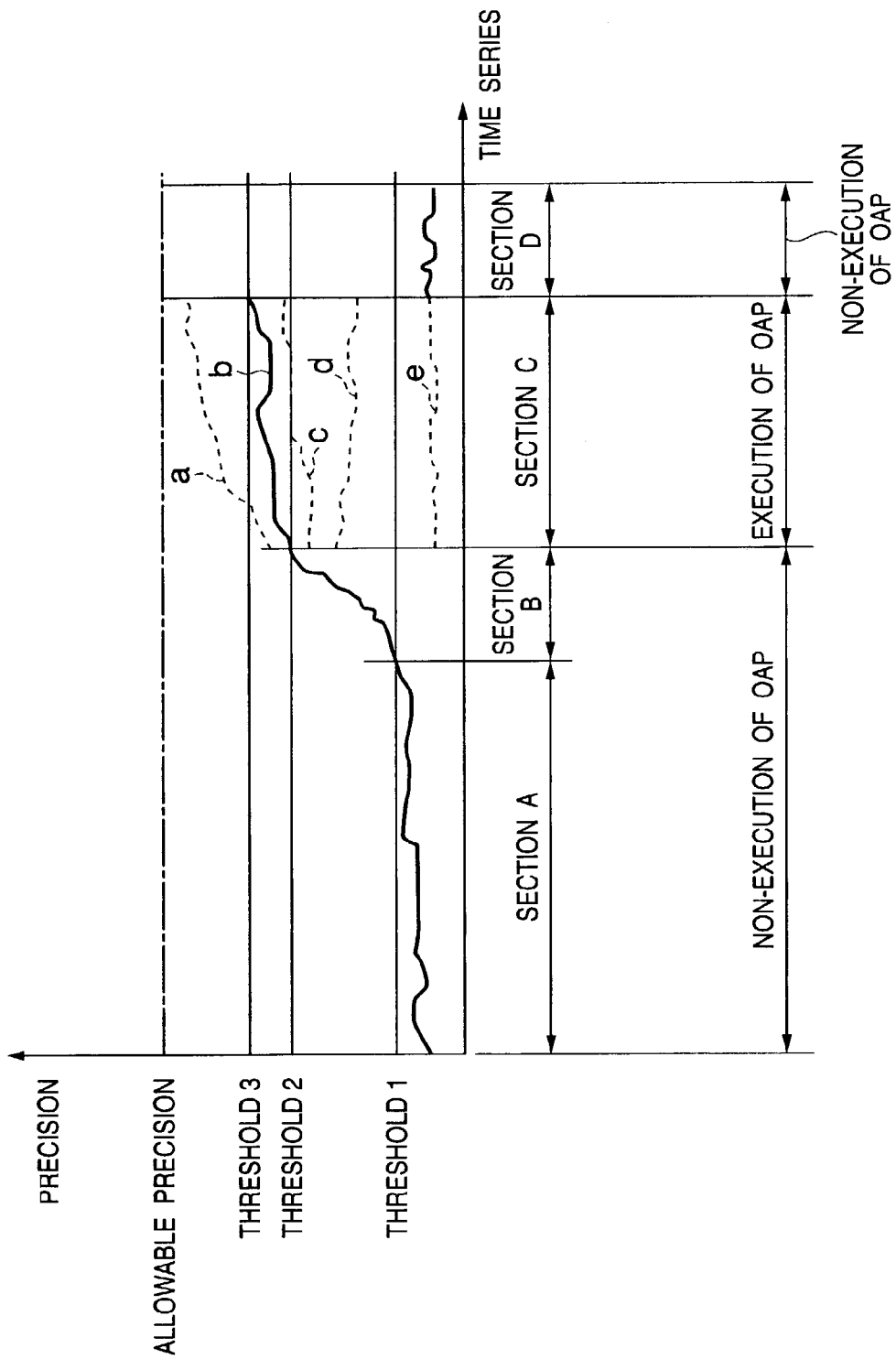
FIG. 9 is a graph showing an example of level decision analysis for variations in wafer alignment precision according to the third embodiment.

FIG. 9 is a graph according to the third embodiment. The ordinate represents the precision serving as a criterion for evaluating the overlay performance. The precision is set to many threshold levels, within an allowable precision range, for each semiconductor process. In this example, three levels, i.e., thresholds 1 to 3 are set.

The abscissa represents the result of monitoring in time series the overlay performance of a single exposure apparatus for every identical step in the semiconductor process. Each of sections A to E indicates a section in which a change in precision kept monitored for a lot in the semiconductor process step falls within a given threshold range. Also, OAP sequence operation of an exposure apparatus is different in each of the sections.

The definition and content of the precision along the ordinate will be described. The precision criterion is an evaluation criterion based on an error after exposure by the exposure apparatus and measurement by the overlay inspection apparatus. Another criterion is a residual error amount after obtaining the wafer in-plane error of the wafer magnification, wafer rotation, or orthogonality by AGA measurement and increasing the precision by the stage. The correlation between a result by the overlay inspection apparatus and the residual error amount is attained to predict even the pseudo AGA precision result of a parameter value other than a job parameter value. These evaluation data can be stored in a database 5 of FIG. 1, and evaluated and changed in accordance with the apparatus operation situation and use purpose.

The definition of the threshold will be described. The threshold is defined as follows. The threshold is set by dividing the precision allowance for each process of each semiconductor device into multiple stages. Threshold 1 or less is a precision level at which a job parameter and signal processing are decided to be optimal with a margin enough for the overlay precision allowance. The range of threshold 2 higher than threshold 1 is a section in which the trend of decreasing the precision is checked by monitoring the evaluation database stored in the database 5, and if the precision evaluation degrades, the inspection frequency of wafers in a lot, which are inspected by the overlay inspection apparatus, is increased.

The range of threshold 3 higher than threshold 2 is a section in which OAP is applied because the overlay precision margin decreases as a result of monitoring the database accumulated in the database 5. Application of OAP is determined at a level higher than threshold 2. At this precision level, a PC 4 compares and examines a plurality of signal processes for an alignment signal waveform and data mining, such as various multivariate parameter optimization methods. The PC 4 selects, applies, and examines optimization signal processing. In section C of FIG. 9, line segments a to e represent that a plurality of combinations of OAP job parameter values are selected. Processing at each broken portion shows a change in precision data stored in the database after optimization examination based on data mining and sample processing. Broken lines a, c, d, and e represent pseudo AGA results, and the solid line of line segment b represents a precision with the current job parameter value. Line segment b corresponds to the current job setting value, and overlay data by the overlay inspection apparatus exists because the exposure apparatus performs actual exposure. In this case, a combination of parameter values other than the job setting value that is represented by broken line e is equal to or lower than threshold 1 and is optimal.

If the precision exceeds threshold 3, the parameter is changed to a parameter optimized by OAP. Note that the optimal parameter condition in section B is kept for a specific number of lots to ensure the reliability of changing the parameter value. Even with threshold 2, the parameter can also be changed to an optimal parameter as far as the stability is ensured for the specific number of lots. When the stability is not ensured for the specific number of lots, the precision may decrease. A warning limit (not shown) can be set between threshold 3 and the allowable precision, and if the precision exceeds this limit, to immediately return the parameter value to an optimal one.

In this example, a combination of optimal parameters as a result of examining optimization in section B is read out from the database and actually applied.

Management operation in a section according to the third embodiment will be explained. Each section is a range where the operation is changed for each section by a management system according to the third embodiment. In section A, the precision is very stable at a level of threshold 1 or less, and no OAP is done. Apparatus parameters, such as job setting AGA data and data on processing results, are accumulated in the database 5 and overlay inspection operation continues, so as to monitor job setting measurement results in order to monitor the precision with a job setting parameter value.

In section B, between threshold 1 and threshold 2, the allowable precision margin decreases. To confirm OAP application and level decision, the number of inspection sample wafers in a lot that are inspected by the overlay inspection apparatus is changed on the basis of job setting AGA processing data confirmed in the database 5 and wafer sampling data by the overlay inspection apparatus. If the precision decreases, the management system of the third embodiment increases the inspection frequency of the overlay inspection apparatus.

In section C, OAP is performed, the PC 4 requires AGA data other than a job parameter by OAP and the exposure apparatus, and optimization of various parameters and optimization of signal processing are simulated, predicted, and examined in OAP. The PC 4 performs various signal processing, and compares and examines precision evaluation data stored in the database 5 to examine optimal parameters. On this stage, a parameter optimal enough and signal processing is selected and examined in OAP.

Section D represents a result of setting optimal parameters. Since the precision range of threshold 1 is confirmed, no OAP is executed again.

OAP and exposure apparatus operation in each section will be described in detail.

In section A, the precision is stable enough for the precision allowance. A job parameter set for a lot is a satisfactory set value, and no parameter need be changed by OAP. In this region, a decrease in apparatus throughput can be prevented by stopping acquisition of AGA data other than a job parameter that decreases the throughput. In this region, AGA measurement data other than a job parameter need not be acquired by ADUL and stored in the database, which is referred to by the PC 4. ADUL can be determined not to be executed when lots with precisions lower than threshold 1 continue by specific lots. The specific lots can be changed, and the setting may be decided by the job setting.

In section B, the precision gradually decreases. In this example, the precision exceeds threshold 1. When the precision exceeds threshold 1, no parameter is changed. In section C, the precision exceeds threshold 2. In this case, the margin for the allowable precision further decreases, and OAP is actually applied. The apparatus is operated so as to acquire data with parameter values other than a job parameter necessary for OAP. As for AGA, alignment measurement of the wafer position is done except for the job setting, acquiring alignment waveform data. Pseudo AGA operation is performed on the basis of an alignment signal acquired by the PC 4, and a combination of optimal parameters is stored in the database. While the overlay precision is recorded in the database, overlay precision evaluation data accumulated in the database 5 are sequentially monitored unless the precision exceeds threshold 2. If the precision tends to decrease (the precision is decided to decrease when precision evaluation data exhibit a continuous decrease for specific lots), the frequency of acquiring AGA data other than a job parameter is increased to improve the reliability of deciding parameter values other than a job parameter. However, an increase in acquisition frequency decreases the throughput.

In section C, the precision exceeds threshold 3 (solid line in section C represents apparatus operation with the current job parameter value). In this case, the margin for the allowable precision further decreases, and the parameter is optimized and changed. A job setting parameter candidate in section C has already been determined, and can be quickly applied.

Broken lines a, c, d, and e represent predicted application examples. Within the range of threshold 1, which is an optimal parameter setting in section C, a parameter optimization example represented by broken line e is performed. In this example, the precision returns to threshold 1. The precision may not decrease to threshold 1. In this case, an optimal parameter value is selected.

Section D represents the state of the job parameter value, which is optimized by OAP in section C. In this example, the precision becomes stable.

The third embodiment has been described with reference to FIG. 9. In this embodiment, the operation status of the apparatus is finely evaluated in accordance with the multilevel precision evaluation criterion. The operations of the apparatus and management systems are changed, effectively achieving setting of an optimal parameter and selection of signal processing, which determine the apparatus performance.

In the third embodiment, the allowable precision required for each semiconductor process is divided into multilevel thresholds for a plurality of precision evaluation criteria. The apparatus performance is evaluated in time series at the respective thresholds, and the apparatus operation is changed in accordance with variations in threshold. In the example of FIG. 9, four modes (sections A to D) are set for the apparatus operation. The operation can be changed in accordance with an industrial apparatus for use.

FOURTH EMBODIMENT

A method of changing the threshold level in accordance with the industrial apparatus and a method of predicting and setting an optimal parameter will be described as the fourth embodiment.

In an alignment example of the exposure apparatus, there can be set a threshold level for a decision level used to optimize an alignment parameter, a threshold level at which the apparatus is operated with a parameter other than a job setting to decide the frequency of acquiring data on operation with the parameter other than the job setting in order to compare and examine candidate parameter values for optimizing a parameter, and a threshold level at which the job setting parameter can be decided not to be changed because the set parameter satisfies the allowable precision level and stable apparatus performance can be continuously obtained. With a means for monitoring the apparatus performance in time series, these thresholds can be changed against variations in apparatus status. As the threshold level division method, measurement data with a job parameter and another parameter by OAP, and measurement data by the overlay inspection apparatus may be sequentially accumulated, and after a time-series variation trend is confirmed, may be classified. Alternatively, data may be classified in advance in accordance with the overlay precision of the apparatus with respect to the semiconductor process. A semiconductor process step with a high overlay precision in the exposure apparatus has a relatively stable overlay precision, and the margin for the allowable precision can be set to be large.

A semiconductor process step with a low overlay precision in the exposure apparatus cannot ensure any margin for the allowable precision. Thus, a parameter value and signal processing must be selected while a PC 4 precisely predicts optimization. In this case, data, which have been acquired and accumulated in a database, are analyzed and predicted.

For example, the correlation between an AGA measurement result and a result by the overlay inspection apparatus is obtained, and the AGA measurement result can be adopted. The alignment mark interval (variations between mark intervals: respective mark intervals have the same design value, and thus, evaluation may employ variations between mark elements) used in alignment signal processing can be used as an evaluation criterion by obtaining the correlation between each AGA measurement shot and a residual error after AGA measurement correction.

The correction between parameters can be effectively obtained by an optimization method using data mining, such as a decision making system or neutral network method. The correlation between changes in parameters and various precision evaluation criteria accumulated is optimized by data mining. A smaller number of predicted parameter candidates can be compared, optimizing apparatus parameters.

FIFTH EMBODIMENT

Figure 10:
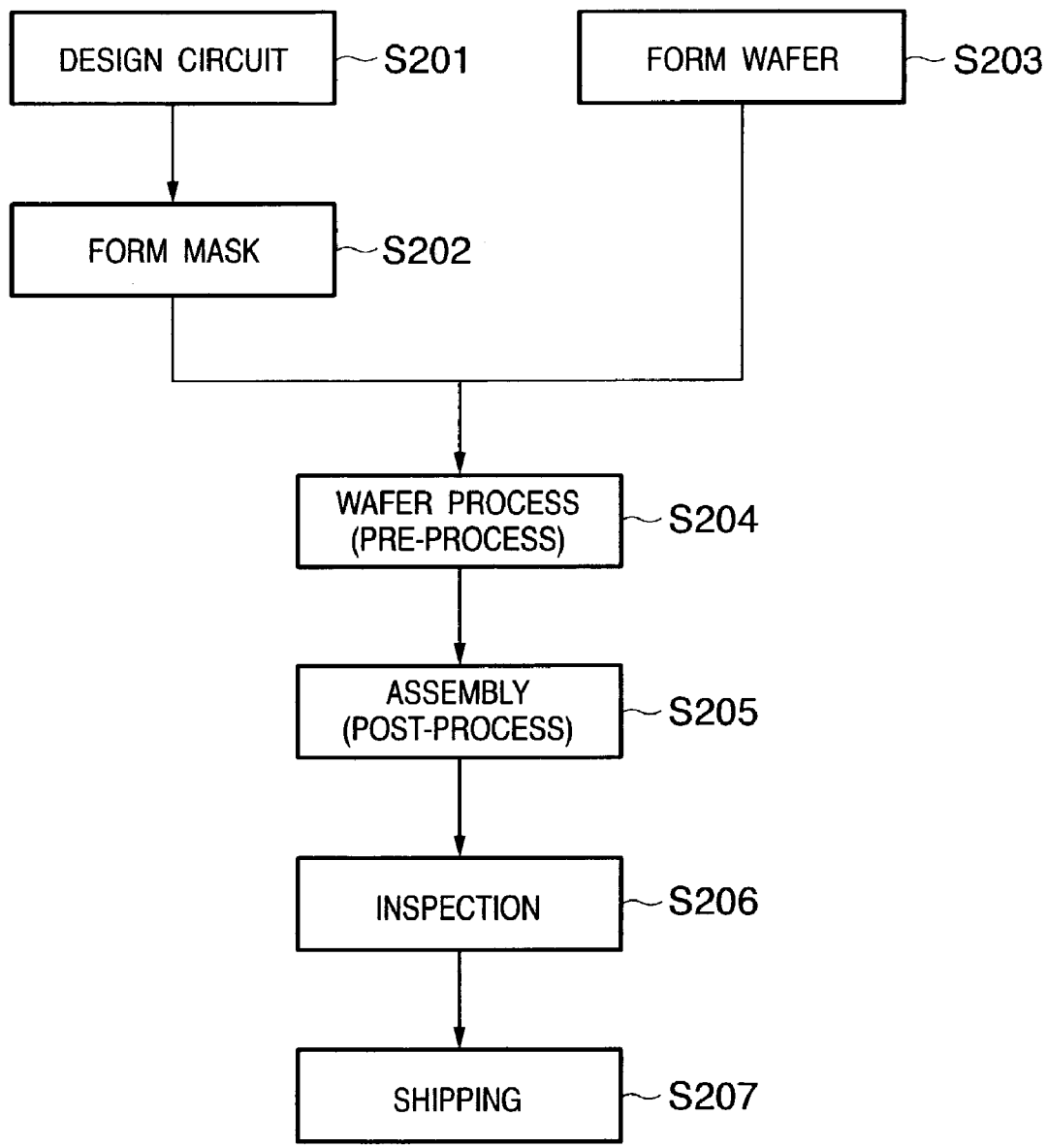
FIG. 10 is a flow chart for explaining the flow of a device manufacturing process.

A semiconductor device manufacturing process using the above-described semiconductor exposure apparatus will be explained. FIG. 10 shows the flow of the whole manufacturing process of manufacturing a semiconductor device. In step S201 (circuit design), a semiconductor device circuit is designed. In step S202 (mask formation), a mask having the designed circuit pattern is formed. In step S203 (wafer formation), a wafer is formed using a material such as silicon. In step S204 (wafer process), called a pre-process, an actual circuit is formed on the wafer by lithography using the prepared mask and wafer. Step S205 (assembly), called a post-process, is the step of forming a semiconductor chip by using the wafer formed in step S204, and includes an assembly process (dicing and bonding) and a packaging process (chip encapsulation). In step S206 (inspection), the semiconductor device manufactured in step S205 undergoes inspections such as an operation confirmation test and a durability test. After these steps, the semiconductor device is completed and shipped (step S207). For example, the pre-process and post-process are performed in separate dedicated factories, and each of the factories receives maintenance by a remote maintenance system. Information for production management and apparatus maintenance is communicated between the pre-process factory and the post-process factory via the Internet or dedicated network.

Figure 11:
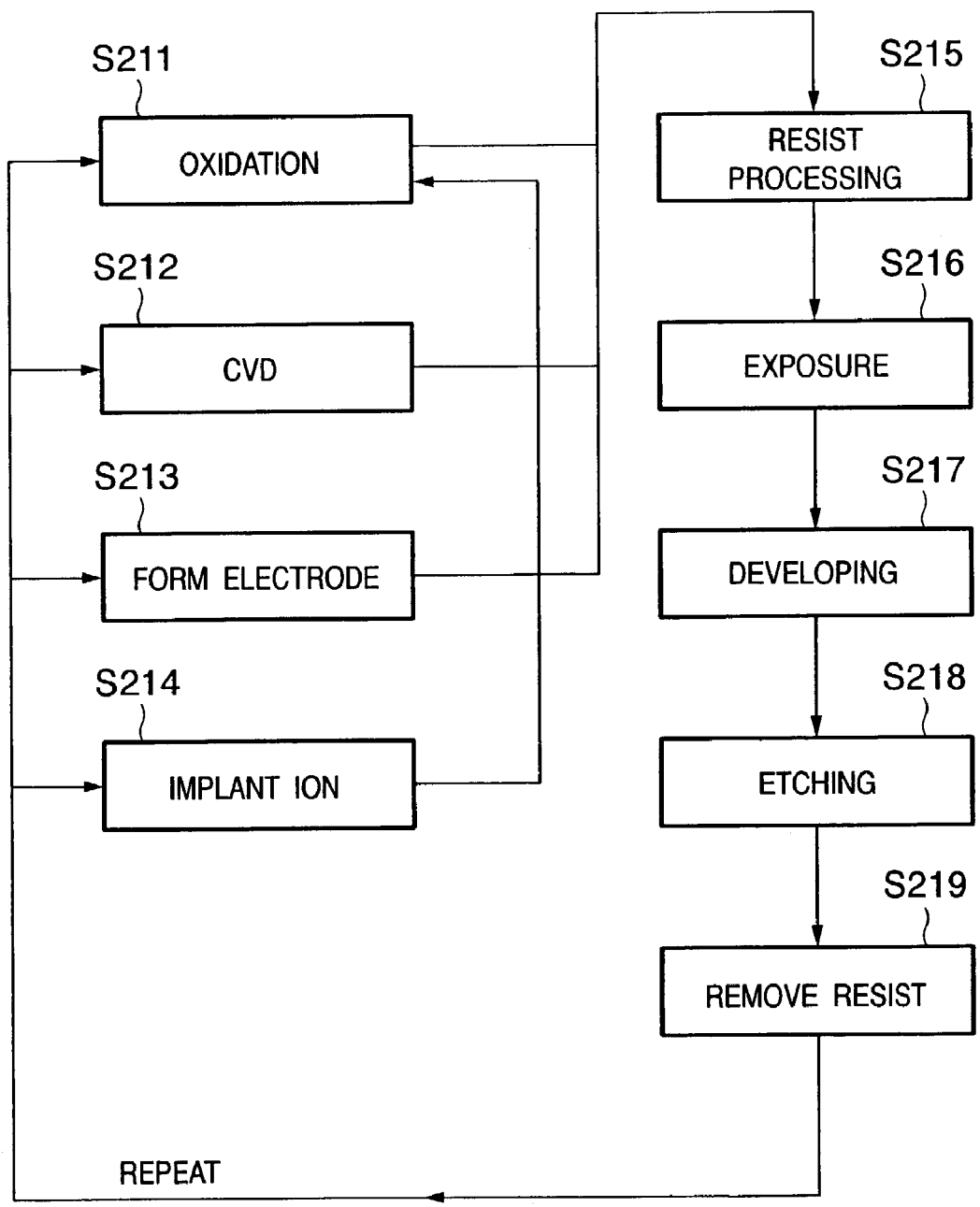
FIG. 11 is a flow chart for explaining a wafer process.

FIG. 11 shows the detailed flow of the wafer process. In step S211 (oxidation), the wafer surface is oxidized. In step S212 (CVD), an insulating film is formed on the wafer surface. In step S213 (electrode formation), an electrode is formed on the wafer by vapor deposition. In step S214 (ion implantation), ions are implanted in the wafer. In step S215 (resist processing), a photosensitive agent is applied to the wafer. In step S216 (exposure), the above-mentioned exposure apparatus exposes the wafer to the circuit pattern of the mask, and prints the circuit pattern on the wafer. In step S217 (developing), the exposed wafer is developed. In step S218 (etching), the resist is etched except for the developed resist image. In step S219 (resist removal), an unnecessary resist after etching is removed. These steps are repeated to form multiple circuit patterns on the wafer. The exposure apparatus used in this process is optimized by the above-described management system, which can prevent degradation over time, or the like, caused by fixed parameters. Even if a change over time occurs, the exposure apparatus can be widely optimized without stopping volume production and properly preventing a decrease in processing speed, increasing the semiconductor device productivity in comparison with the prior art.

In the above-described embodiments, the semiconductor exposure apparatus is adopted as an industrial device, and the wafer alignment parameter value is optimized. The present invention is not limited to this. For example, the present invention may be applied to a CMP apparatus, or the wafer focusing function of the semiconductor exposure apparatus.

The present invention is also achieved when a storage medium, which stores software program codes for realizing the functions of the above-described embodiments, is supplied to a system or apparatus, and the computer (or the CPU or MPU) of the system or apparatus reads out and executes the program codes stored in the storage medium.

In this case, the program codes read out from the storage medium realize the functions of the above-described embodiments, and the storage medium, which stores the program codes, also constitutes the present invention.

The storage medium for supplying the program codes includes a floppy disk, a hard disk, an optical disk, a magnetooptical disk, a CD-ROM, a CD-R, a magnetic tape, a non-volatile memory card, and a ROM.

The functions of the above-described embodiments are realized when the computer executes the readout program codes. Also, the functions of the above-described embodiments are realized when an OS (Operating System), or the like, running on the computer performs part of or all of the actual processing on the basis of the instructions of the program codes.

The functions of the above-described embodiments are also realized when the program codes read out from the storage medium are written in the memory of a function expansion board inserted into the computer or the memory of a function expansion unit connected to the computer, and the CPU of the function expansion board or function expansion unit performs part of or all of the actual processing on the basis of the instructions of the program codes.

As has been described above, the present invention can optimize the parameter value of an industrial device during volume production by the industrial device. In addition, the present invention can achieve optimization of a parameter value during volume production while preventing a decrease in volume production throughput.

As many apparently widely different embodiments of the present invention can be made without departing from the spirit and scope thereof, it is to be understood that the invention is not limited to the specific embodiments thereof except as defined in the claims.

What is claimed is:

1. A management system comprising:
   acquisition means for acquiring actual processing results obtained by operating an industrial device with a set parameter value and another parameter value, and an estimated processing result;
   inspection means for inspecting the processing result obtained with the set parameter value, and acquiring and accumulating an inspection result value;
   change means for changing the set parameter value on the basis of the processing results acquired by said acquisition means and the inspection result value obtained by said inspection means;
   evaluation means for evaluating a variation state of the processing results on the basis of an inspection result value accumulated by said inspection means; and decision means for deciding, on the basis of an evaluation result by said evaluation means, a frequency at which said acquisition means is executed.

2. The system according to claim 1, wherein
said evaluation means obtains a variation cycle of a shift amount between an inspection value and a processing result serving as an inspection result by said inspection means, and
said decision means decides the frequency of on the basis of the variation cycle.

3. The system according to claim 1, wherein
said evaluation means obtains variations in shift amount between an inspection value and a processing result serving as an inspection result by said inspection means, and
said decision means decides the frequency on the basis of a degree of the variations.

4. The system according to claim 3, wherein said decision means prepares a plurality of thresholds at multiple levels for the variations in shift amount, and decides the frequency on the basis of which region contains the variations obtained by said evaluation means.

5. The system according to claim 1, wherein said decision means decides, on the basis of the evaluation result by said evaluation means, a frequency at which said evaluation means is executed, and when an evaluation result by said evaluation means for processing results in a predetermined amount is determined to become stable, decides a frequency at that time as the frequency at which said acquisition means is executed.

6. The system according to claim 5, wherein said evaluation means is executed for all processing results until the frequency at which said evaluation means is executed is not decided.

7. The system according to claim 1, wherein said evaluation means statistically processes the inspection result in time series, and evaluates the variation state.

8. The system according to claim 5, further comprising:
determination means for determining, on the basis of the variation state, whether the set parameter value must be optimized; and
optimization execution means for executing optimization of the parameter value by said acquisition means and said optimization means when the set parameter value is determined to be optimized.

9. The system according to claim 8, wherein when said optimization execution means changes the parameter value, said inspection means inspects all processing results in a predetermined amount after the change.

10. The system according to claim 8, wherein when the variation state of the processing result abruptly changes, said determination means determines that the set parameter value must be optimized.

11. The system according to claim 1, wherein said evaluation means evaluates the variation state of the results acquired by said acquisition means, the estimated processing result, and the inspection result accumulated by said inspection means.

12. The system according to claim 1, wherein execution of said acquisition means is managed based on an inspection result of said inspection means.

* * * * *

UNITED STATES PATENT AND TRADEMARK OFFICE
CERTIFICATE OF CORRECTION

PATENT NO. : 7,069,104 B2  
APPLICATION NO. : 10/423888  
DATED : June 27, 2006  
INVENTOR(S) : Takehiko Suzuki et al.

Page 1 of 1

It is certified that error appears in the above-identified patent and that said Letters Patent is hereby corrected as shown below:

ON THE TITLE PAGE:
  Item "(56) References Cited," on the second page, under "OTHER PUBLICATIONS," the first-listed reference to "Lee, C., et al." should be deleted.
  Item "(56) References Cited," on the second page, under "OTHER PUBLICATIONS," the fourth-listed reference to "van den Brink, M.A., et al." should be deleted.

COLUMN 10:
  Line 34, "wafers/It," should read -- wafers/lot, --.

COLUMN 11:
  Line 26, "3σvalue," should read -- 3σ value, --.

COLUMN 15:
  Line 29, "Ajob" should read -- A job --.

COLUMN 19:
  Line 9, "of" should be deleted.

Signed and Sealed this

Twenty-sixth Day of December, 2006

JON W. DUDAS  
*Director of the United States Patent and Trademark Office*